Patented Jan. 9, 1940

2,186,549

UNITED STATES PATENT OFFICE 2,186,549

PROCESS FOR PRESERVING FRUIT PEELS AND RINDS

William C. Luban, Tampa, Fla.

No Drawing. Application March 7, 1938,
Serial No. 194,445

3 Claims. (Cl. 99—156)

This invention relates to improvements in methods of preserving the rinds of fruits, particularly citrus fruits, in substantially their natural state for relatively long periods, from the time of their removal from the fruit, during the period of storage, of cleaning and grading, and of shipment to the place where they are processed with sugar and sugar syrups for use as confectionery or in baking.

The invention will be described as applied to the citrus fruit commonly known as "grapefruit," which has a rather thick rind or peel, with an outer layer of cells containing an oil, and a thicker layer of whitish color and substantially without oil. This rind can be candied to produce a material closely resembling candied citron peel. Other citrus fruits have thinner rinds which can also be candied.

The grape fruit grows in sub-tropical climates, such as that of Florida, and the juice and the juicy pulp sections are both prepared for the market by removing the rinds, placing the pulp sections or the juice in tinned cans, and after sealing the cans, applying heat to sterilize the contents. The rinds are a by-product which are not usually candied or otherwise processed by the canneries that put up the juice or the pulp. The canning process is a rapid one and the rinds accumulate in large quantities. This rind or peel of citrus fruits is very susceptible to the attack of what is known as "blue mold," which quickly causes decay, and there are always yeasts, molds, bacteria, and other microorganisms present to cause deterioration. Formerly, when the canning of grapefruit pulp and juice for the market was new, the rinds were thrown away as waste. At present, some of the rinds are taken from the cannery during the relatively short season in which the canning process is carried on, placed immediately in a salt brine, where a fermentation soon ensues, lasting for three or four weeks, depending upon the temperature, brine being added if necessary to replace losses, and after the fermentation is done, the rinds are removed from the brine or the brine is drawn off the rinds, and the rinds are then given a stronger brine in which they remain substantially unchanged until they are reached for further treatment. In this way, a large quantity of the rinds can be saved quickly and kept in storage to await the relatively slow process of cleaning, sorting, and preparation for candying.

At some time later in the year, rinds removed from the storage brine are cleaned of refuse, selected for quality, cut into smaller pieces, again placed in brine, and shipped to northern factories where they remain in the brine until taken out for candying.

A process such as described has many disadvantages and requires a great deal of space. The fermentation which occurs soon after the rind is removed and placed in the first brine does not improve the flavor, wholesomeness, or texture of the candied final product. Additional labor is required for handling the rinds and the containers and for changing the brine. Losses occur from softening and discoloration in upper layers exposed to air when the brine gets too low because of leakage or evaporation. Liquid-tight containers are heavy and expensive, and when rinds are shipped in brine in such containers, freight must be paid on a considerable weight which does not enter into the finished product. Rinds removed from the brine spoil quickly, and drying or dehydration causes such changes in texture and flavor as to render the rinds unfit for the process of candying. Before candying, the salt must be removed by soaking, and if not fully removed, the taste of the product is impaired. The salt brine inhibits the growth of microorganisms while the peel is covered, but after candying, the product is likely to become moldy in storage and otherwise deteriorates.

Under the present process, the rinds, taken as soon as possible after they are removed from the fruit, are placed in tight containers. A fifty gallon barrel holds about two hundred and seventy-five pounds of peel. Liquid sulphur dioxide is then introduced into each container with the rinds, the dioxide being a little less than one percent of the weight of the rinds. The containers are then closed tight to prevent the escape of the dioxide.

So treated, the rinds remain in fresh condition with no trace of fermentation until such time as they are removed from the container for the next step in the process, in which all refuse pulp and "rag" is removed, together with any undesirable pieces of rind. If desired, the selected rinds are then cut into small pieces to facilitate the candying step. The product is now ready for candying, but since the factories where candying is done are usually in a distant location, the prepared rinds are placed in light containers which are strong enough for ordinary freight or express shipment, and which will protect the product from dust and dirt, but which may admit air freely. Because of the use of such light containers and the absence of liquid, freight or express charges are relatively small as compared with the former shipments in brine with heavy containers.

Thus processed, the rinds have been shipped long distances and have been kept for considerable periods without injurious deterioration after reaching the candying factory. The rinds are ready for the candying process when received. The natural moisture of the rind is kept substantially intact and the candied product is firmer and lighter in color than when brine is used. The action of the dioxide on the fresh peel causes a certain amount of bleaching and hardening which improves the appearance and texture of the final product. This is true even when the rinds are candied immediately after removal from the fruit without being held in storage. The microorganisms that may have been present appear to have been completely destroyed. Rinds that are kept in brine too long, become softer and are likely to darken in color so that the finished product is inferior in texture and in color to that of the sulphurized rinds.

Sulphur dioxide, $SO_2$, dissolves immediately in water to form sulphurous acid, $H_2SO_3$. In certain cases, a small amount of sulphurous acid has been added to the strong brine used for storage of the fermented peel to prevent darkening, but this one-tenth of one percent of the acid considered as $SO_2$, so used, is not enough to cause the desirable hardening and would not prevent fermentation if used in the original brine.

In a certain theory of chemical action, it is held that certain gases cannot act chemically in the absence of water, and it would thus appear probable that the action of the dioxide upon a moist organic substance is actually the effect of sulphurous acid or of its ions. While the use of water either during the preliminary storage period or in shipment is not desirable because of the added labor and expense, it has been found that the dioxide can be added to the water covering the rins in substantially the same proportion as when used dry, and in this sufficient concentration, it will prevent fermentation and will cause the hardening and bleaching which so much improves the finished product.

It is to be understood, therefore, that the present process is not to be considered as limited to the action of a dry gas upon dry rinds, but that it extends to the use of the dioxide of sulphur with any quantity of water which does not so greatly dilute it as to prevent the beneficial action of the dioxide as set forth. Any acid or dioxide present in the rinds is dissolved and removed in the first washing and cooking water of the candying process.

I claim:

1. The process of preparing the rind of citrus fruits for candying which comprises removing the rind from the fruit, dividing the rind into pieces, placing the pieces in a container with sufficient sulphur dioxide and for a sufficient period of time to cause hardening of the rind, and then candying the pieces.

2. In a process of candying the rind of grapefruit wherein the rind is removed from the fruit near its place of growth and shipped to a distant point for the completion of the process, the step which consists in treating the fresh rind in its natural condition and removed from the fruit with sulphur dioxide in sufficient concentration to prevent fermentation and to harden the rind.

3. The process of treating the rind of grapefruit which comprises subjecting the rind to the chemical action of sulphurous acid in sufficient concentration to harden the rind and prevent fermentation.

WILLIAM C. LUBAN.